United States Patent
Oh et al.

(10) Patent No.: US 10,585,115 B2
(45) Date of Patent: Mar. 10, 2020

(54) SCANNING PROBE INSPECTOR

(71) Applicant: SAMSUNG ELECTRONICS CO., LTD., Suwon-si, Gyeonggi-Do (KR)

(72) Inventors: Duck Mahn Oh, Suwon-si (KR); Sung Yoon Ryu, Suwon-si (KR); Young Hoon Sohn, Incheon (KR); Chung Sam Jun, Suwon-si (KR); Yun Jung Jee, Seongnam-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 16/130,699

(22) Filed: Sep. 13, 2018

(65) Prior Publication Data

US 2019/0170788 A1 Jun. 6, 2019

(30) Foreign Application Priority Data

Dec. 6, 2017 (KR) .......................... 10-2017-0166486

(51) Int. Cl.
*G01Q 60/00* (2010.01)
*G01Q 60/16* (2010.01)
*G01Q 80/00* (2010.01)
*G02B 21/00* (2006.01)

(52) U.S. Cl.
CPC ............ *G01Q 60/16* (2013.01); *G01Q 80/00* (2013.01); *G02B 21/002* (2013.01)

(58) Field of Classification Search
CPC ....... G01Q 60/16; G01Q 80/00; G02B 21/002
USPC .................................................. 850/5, 6, 7
See application file for complete search history.

(56) References Cited

U.S. PATENT DOCUMENTS

| | | | | |
|---|---|---|---|---|
| 5,242,541 A | * | 9/1993 | Bayer | G01Q 60/04 216/11 |
| 6,223,591 B1 | * | 5/2001 | Nakano | B82Y 35/00 250/307 |
| 6,246,054 B1 | * | 6/2001 | Toda | G01Q 60/38 850/1 |
| 7,429,732 B2 | | 9/2008 | Kneeburg et al. | |
| 7,770,439 B2 | | 8/2010 | Mininni | |
| 8,245,318 B2 | * | 8/2012 | Jin | B82Y 15/00 850/56 |
| 8,776,261 B2 | | 7/2014 | Kley | |
| 2003/0160170 A1 | * | 8/2003 | McMaster | G01Q 20/02 250/306 |
| 2014/0306731 A1 | | 10/2014 | Wang | |

(Continued)

FOREIGN PATENT DOCUMENTS

| | | |
|---|---|---|
| JP | 08-160109 | 6/1996 |
| JP | 2005188943 | 7/2005 |

*Primary Examiner* — Michael Maskell
(74) *Attorney, Agent, or Firm* — F. Chau & Associates, LLC

(57) ABSTRACT

A scanning probe inspector comprises: a probe that includes a cantilever and a tip whose length corresponds to a depth of a trench that is formed in a wafer; a trench detector that acquires location information of the trench using the probe, where the location information includes depth information of the trench; a controller that inserts the tip into a first point where there exists a trench based on the location information of the trench, and moves the tip through the trench using the location information of the trench; and a defect detector that detects a presence of a defect in a sidewall of the trench as the tip is moved through the trench.

18 Claims, 22 Drawing Sheets

(56) References Cited

U.S. PATENT DOCUMENTS

| | | | |
|---|---|---|---|
| 2015/0026847 A1* | 1/2015 | Pai | G01Q 60/16 850/29 |
| 2015/0067931 A1* | 3/2015 | Hagmann | G01Q 30/20 850/18 |
| 2015/0355226 A1* | 12/2015 | Randall | B82B 3/0038 850/1 |

* cited by examiner

SCANNING PROBE INSPECTOR

This application claims priority under 35 U.S.C. § 119 from, and the benefit of, Korean Patent Application No. 10-2017-0166486, filed on Dec. 6, 2017 in the Korean Intellectual Property Office, the contents of which are herein incorporated by reference in their entirety.

BACKGROUND

1. Technical Field

Embodiments of the present disclosure are directed to a scanning probe inspector.

2. Discussion of the Related Art

A scanning probe microscope (SPM) is a microscope with a nanoscale resolution that images the surface shape and the electrical characteristics of the sample. Examples of SPMs include an atomic force microscope (AFM), a magnetic force microscope (MFM), and a scanning capacitance microscope (SCM). An SPM analyzes the surface shape of a sample or the electrical characteristics of the sample by moving a probe, or the tip of the probe, while maintaining a certain distance from the surface of the sample.

An SPM can detect defects present on the sidewalls of a three-dimensional (3D) semiconductor structure formed during a semiconductor manufacturing process. Specifically, the probe, or the tip of the probe, of the SPM approaches the sidewalls of the 3D semiconductor structure, forms probe junctions between the probe or probe tip and the sidewalls of the 3D semiconductor structure, and can thus detect defects based on measurement signals generated from the probe junctions by defects on the sidewalls of the 3D semiconductor structure.

However, conventional SPMs have their measurable space limited by the size of their probes or probe tips and thus cannot detect defects in deep trenches where probe junctions cannot be formed.

SUMMARY

Exemplary embodiments of the present disclosure provide a scanning probe inspector capable of detecting a defect present in a deep trench.

Exemplary embodiments of the present disclosure also provide a method of precisely detecting the location of a defect.

According to some exemplary embodiment of the present disclosure, a scanning probe inspector comprises: a probe that includes a cantilever and a tip whose length corresponds to a depth of a trench that is formed in a wafer; a trench detector that acquires location information of the trench using the probe, where the location information includes depth information of the trench; a controller that inserts the tip into a first point in the wafer at a location where there exists a trench based on the location information of the trench, and moves the tip through the trench using the location information of the trench; and a defect detector that detects a presence of a defect in a sidewall the trench as the tip is moved through the trench.

According to some exemplary embodiments of the present disclosure, a scanning probe inspector comprises: a probe that includes a cantilever and a tip whose length corresponds to a depth of a trench that is formed in a wafer; and a controller that moves the tip to a first point where there exists a trench using location information of the trench, inserts the tip into the trench up to a first depth in a Z-axis direction using the location information of the trench, and then moves the tip through the trench along an X-Y plane using the location information of the trench; and a defect detector that detects defects on the sidewalls of the trench as the tip is moved through the trench.

According to some embodiments of the present disclosure, a scanning probe inspector comprises: a probe that includes a cantilever and a tip whose length corresponds to a depth of a trench that is formed in a wafer; a trench detector that acquires location information of the trench using the probe, wherein the location information includes depth information of the trench; and a controller that moves the tip to a first point on the wafer where there exists a trench using the location information of the trench, inserts the tip into the trench up to a first depth in a Z-axis direction using the location information of the trench, and then moves the tip through the trench along an X-Y plane using the location information of the trench.

Other features and exemplary embodiments may be apparent from the following detailed description, the drawings, and the claims.

DETAILED DESCRIPTION

A scanning probe inspector according to some exemplary embodiments of the present disclosure can detect a defect in a trench formed in a wafer during a semiconductor manufacturing process such as fabricating a NAND flash memory or a dynamic random access memory (DRAM).

For example, the scanning probe inspector includes a tip having a length that corresponds to the height of the sidewalls of a three-dimensional (3D) structure formed in a trench during the semiconductor manufacturing process. The scanning probe inspector forms a probe junction between the tip and the sidewalls of the 3D structure by moving the tip toward the sidewalls of the 3D structure. Then, the scanning probe inspector detects a defect in the sidewalls of the 3D structure using a measurement signal generated by the probe junction. A scanning probe inspector will hereinafter be described with reference to FIGS. 1 through 23.

Figure 1:
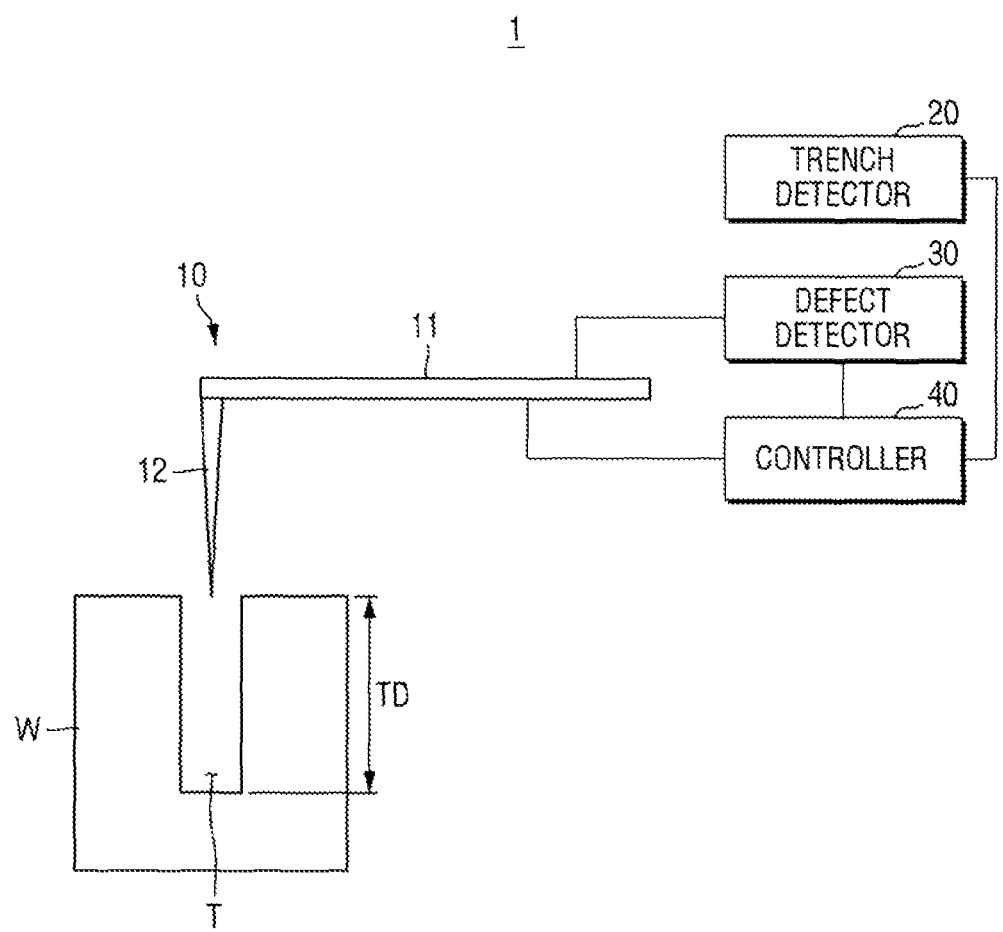
FIG. 1 is a schematic view that illustrates a scanning probe inspector according to some exemplary embodiments of the present disclosure.

FIG. 1 is a schematic view of a scanning probe inspector 1 according to some exemplary embodiments of the present disclosure.

Referring to FIG. 1, according to an exemplary embodiment, a scanning probe inspector 1 includes a probe 10, a trench detector 20, a defect detector 30, and a controller 40. The elements illustrated in FIG. 1, however, are not all necessarily essential for realizing the scanning probe inspector 1, and the scanning probe inspector 1 may include more or fewer elements than those illustrated in FIG. 1.

According to an exemplary embodiment, the scanning probe inspector 1 acquires information regarding a trench T in a wafer W, which is a target object to be inspected, by using the probe 10.

According to an exemplary embodiment, the information regarding the trench T includes location information of the trench T, information indicating whether there exists a defect in the trench T, and location information of the defect.

According to an exemplary embodiment, the location information of the trench T not only includes information regarding the location of the trench T, but also information regarding a depth TD of the trench T. The depth TD of the trench T is the distance from the top to the bottom of the trench T.

According to an exemplary embodiment, the probe 10 includes a cantilever 11 and a tip 12.

According to an exemplary embodiment, the tip 12 has a pyramidal shape with a pointed end. The pointed end of the tip 12 faces the wafer W, or the trench T of the wafer W, and the other end of the tip 12 is connected to the cantilever 11. However, the shape of the tip 12 is not limited thereto. That is, the shape of the tip 12 can vary as will be described below with reference to FIGS. 21 and 22.

In some exemplary embodiments, the tip's 12 length corresponds to the depth TD of the trench T. The width of the tip 12 is less than the width of the trench T, and thus, the tip 12 can be inserted into the trench T to acquire precise information regarding the trench T.

According to an exemplary embodiment, the cantilever 11 has a predetermined length and width, such as dozens or hundreds of μm, and is flexible.

According to an exemplary embodiment, the trench detector 20 uses the probe 10 to acquire location information of the trench T that includes depth information of the trench T For example, according to an exemplary embodiment, the trench detector 20 recognizes the shape, the location, and the depth TD of the trench T based on the movement of the cantilever 11. It will be described below how to acquire the location information of the trench T with reference to FIGS. 3 through 5.

According to an exemplary embodiment, the defect detector 30 determines whether there is a defect in the trench T by using the probe 10. Specifically, the defect detector 30 determines whether there is a defect in the trench T based on the location information of the trench T, acquired by the trench detector 20. A trench T defect can be a dent on a sidewall of the trench T or at the bottom of the trench T. It will be described below with reference to FIGS. 6 through 22 how to detect the presence of a defect in the trench T.

According to an exemplary embodiment, the controller 40 controls the general operation of the scanning probe inspector 1.

According to an exemplary embodiment, the controller 40 moves the tip 12 along at least one of an X-axis, a Y-axis, and a Z-axis direction.

Figure 2:
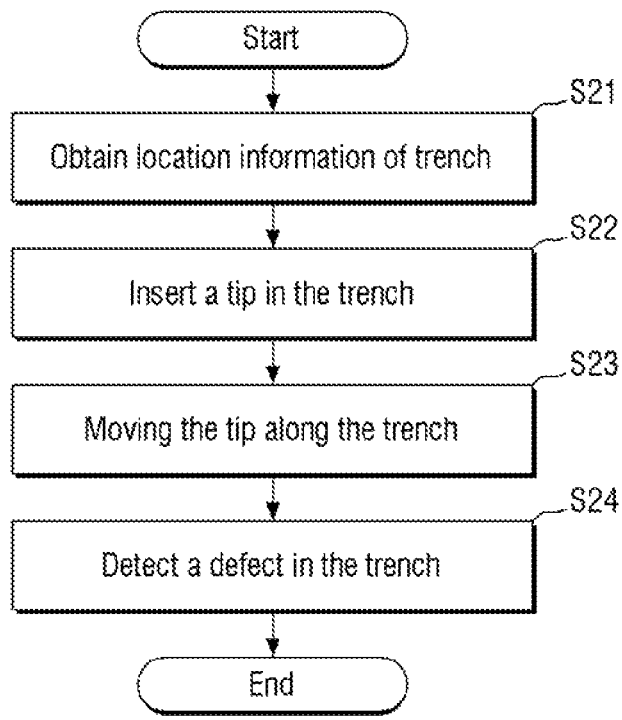
FIG. 2 is a flowchart of a method of detecting a defect in a trench using a scanning probe inspector according to some exemplary embodiments of the present disclosure.
Figure 3:
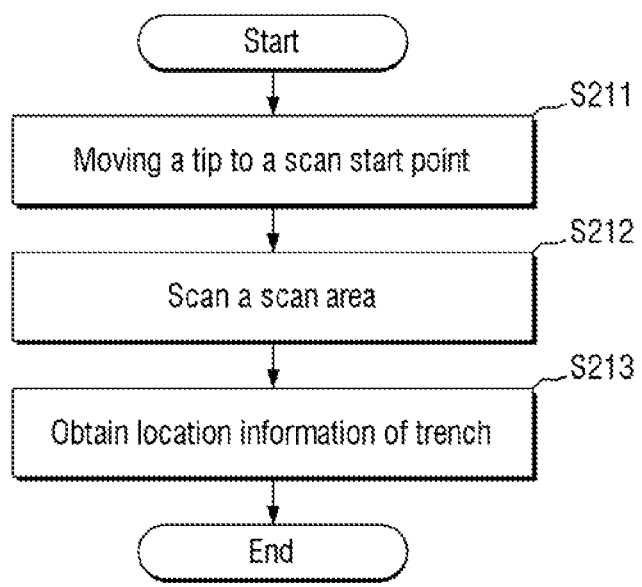
FIG. 3 is a flowchart of a method of acquiring location information of a trench using a scanning probe inspector according to some exemplary embodiments of the present disclosure.
Figure 4:
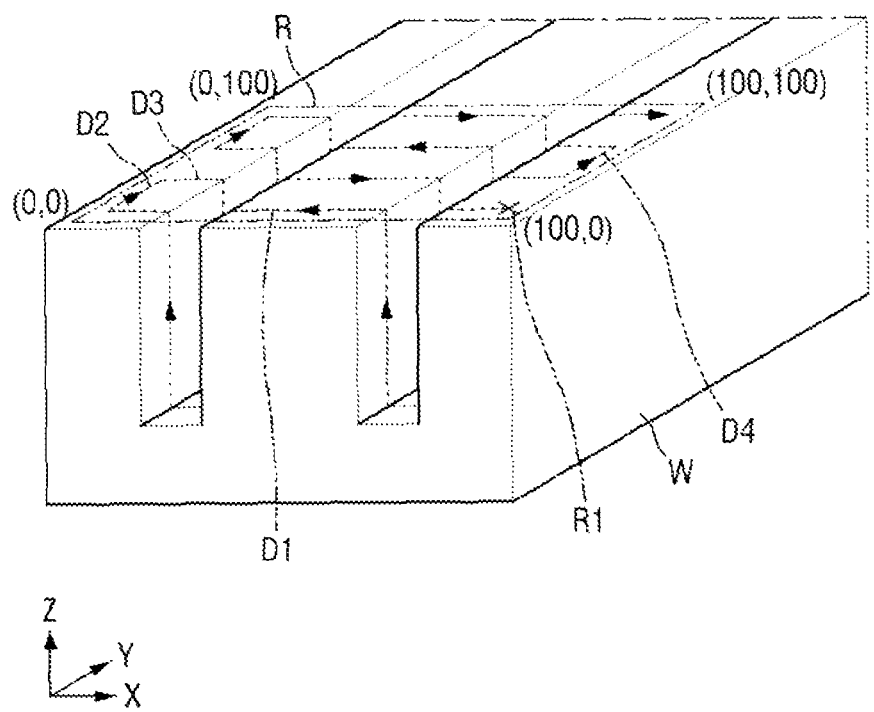
FIG. 4 is a schematic view that illustrates an exemplary method of inserting a tip into a trench to detect the presence of a defect in a trench using a scanning probe inspector according to some exemplary embodiments of the present disclosure.
Figure 5:
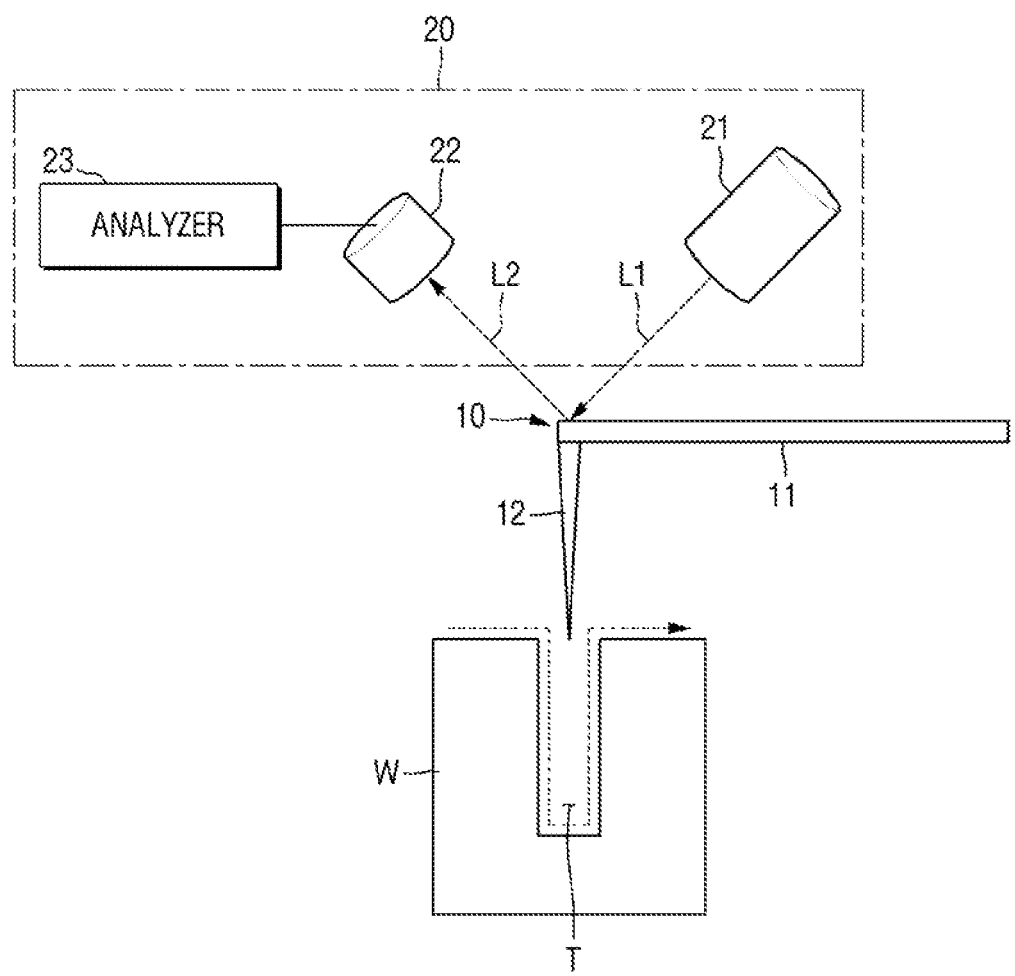
FIG. 5 is a schematic view that illustrates an exemplary method of acquiring location information of a trench formed in a wafer using a scanning probe inspector according to some exemplary embodiments of the present disclosure.
Figure 6:
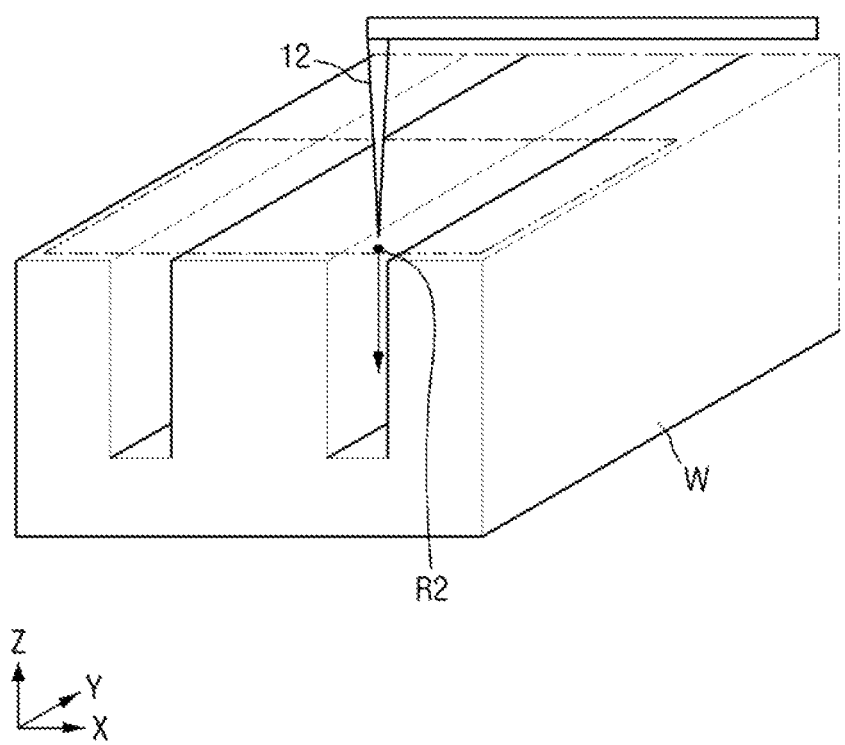
FIG. 6 is a schematic view that illustrates another exemplary method of inserting a tip into a trench to detect the presence of a defect in a trench using a scanning probe inspector according to some exemplary embodiments of the present disclosure.
Figure 7:
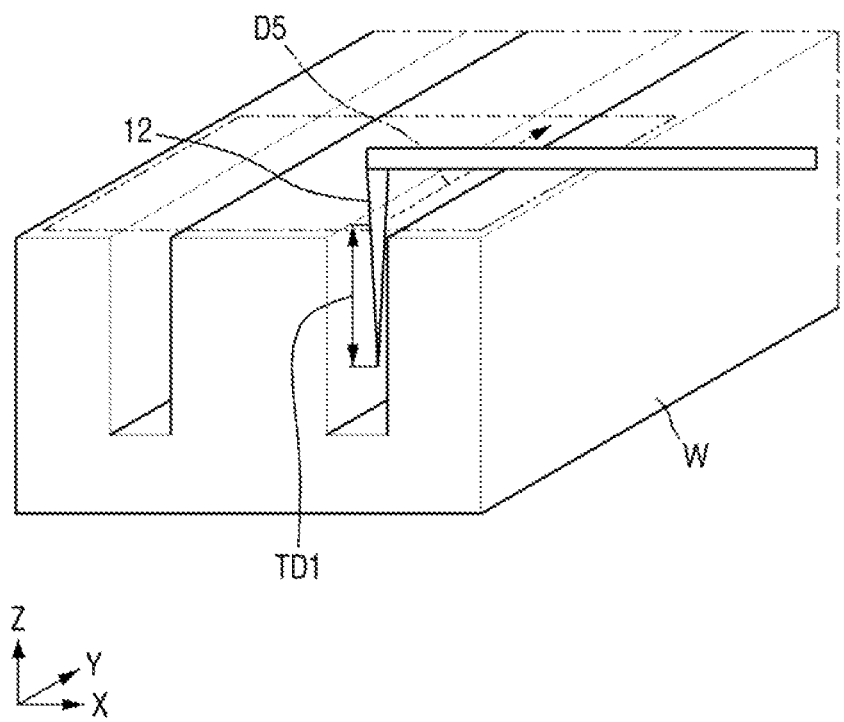
FIG. 7 is a schematic view that illustrates an exemplary method of moving a tip to detect the presence of a defect in a trench using a scanning probe inspector according to some exemplary embodiments of the present disclosure.
Figure 8:
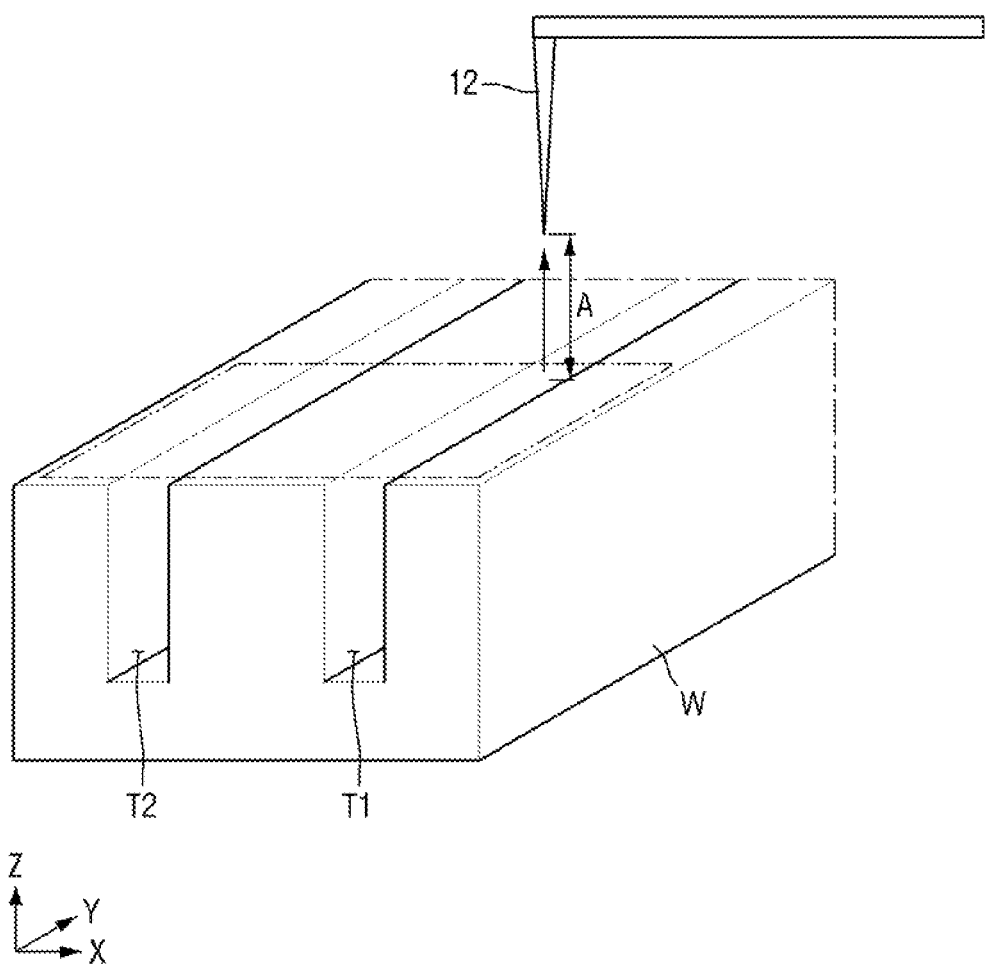
FIG. 8 is a schematic view that illustrates an exemplary method of moving a tip after detecting the presence of a defect in a trench using a scanning probe inspector according to some exemplary embodiments of the present disclosure.
Figure 9:
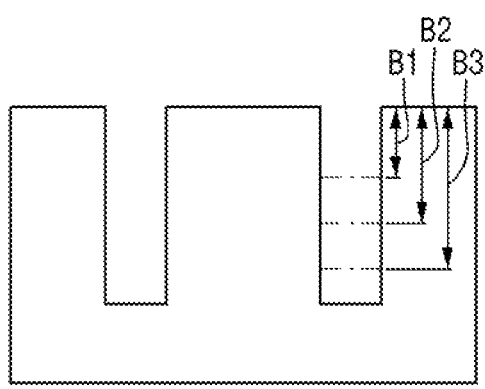
FIG. 9 is a schematic view that illustrates an exemplary method of inspecting a trench for the presence of a defect at multiple depths using a scanning probe inspector according to some exemplary embodiments of the present disclosure.

FIG. 2 is a flowchart of a method of detecting a defect in a trench using a scanning probe inspector 1 according to some exemplary embodiments of the present disclosure. FIG. 3 is a flowchart of a method of acquiring location information of a trench using a scanning probe inspector 1 according to some exemplary embodiments of the present disclosure. FIG. 4 is a schematic view that illustrates an exemplary method of inserting a tip into a trench to detect the presence of a defect in a trench using a scanning probe inspector 1 according to some exemplary embodiments of the present disclosure. FIG. 5 is a schematic view that illustrates an exemplary method of acquiring location information of a trench formed in a wafer using a scanning probe inspector 1 according to some exemplary embodiments of the present disclosure. FIG. 6 is a schematic view that illustrates another exemplary method of inserting a tip into a trench to detect the presence of a defect in a trench using a scanning probe inspector 1 according to some exemplary embodiments of the present disclosure. FIG. 7 is a schematic view that illustrates an exemplary method of moving a tip to detect the presence of a defect in a trench using a scanning probe inspector 1 according to some exemplary embodiments of the present disclosure. FIG. 8 is a schematic view that illustrates an exemplary method of moving a tip after detecting the presence of a defect in a trench using a scanning probe inspector 1 according to some exemplary embodiments of the present disclosure. FIG. 9 is a schematic view that illustrates an exemplary method of inspecting a trench at multiple depths for the presence of a defect using a scanning probe inspector 1 according to some exemplary embodiments of the present disclosure.

Referring to FIG. 2, according to an exemplary embodiment, the scanning probe inspector 1 acquires location information of a trench (step S21).

In step S21, according to an exemplary embodiment, the scanning probe inspector 1 acquires the location information of the trench without detecting any defects in the trench because of the time for the scanning probe inspector 1 to both acquire the trench location information and detect a defect in the trench.

According to an exemplary embodiment, a method of acquiring the location information of the trench is as follows.

Referring to FIG. 3, according to an exemplary embodiment, the controller 40 moves the tip 12 to a scan start point in a scan area (step S211). The scan area is determined by x and y range values entered by a user.

For example, according to an exemplary embodiment, referring to FIG. 4, if the user enters a range of 0 to 100 for the X axis and a range of 0 to 100 for the y axis, the scanning probe inspector 1 sets an area ranging from (0, 0) to (100, 100) on the X-Y plane as a scan area R.

According to an exemplary embodiment, in response to the scan area R being set, the controller 40 moves the tip 12 to a scan start point R1. The scan start point R1 may be set by the user or may be automatically set by the controller 40.

Referring again to FIG. 3, according to an exemplary embodiment, once the tip 12 is moved to the scan start point, the controller 40 move the tip 12 from the scan start point to scan the entire scan area (step S212).

For example, according to an exemplary embodiment, referring again to FIG. 4, the controller 40 moves the tip 12 to the scan start point R1 and then scans the shape of the surface of the wafer W while moving the tip 12 from the scan start point R1 in the negative X-axis direction, as indicated by D1. Thereafter, the controller 40 moves the tip 12 in the positive Y-axis direction by up to a predetermined distance, as indicated by D2. Thereafter, the controller 40 continues to scan while moving the tip 12 in the positive X-axis direction, as indicated by D3. Thereafter, the controller 40 moves the tip 12 in the positive Y-axis direction by up to the predetermined distance, as indicated by D4. By repeating these processes, the controller 40 scans the surface of the wafer W in the scan area R.

Referring again to FIG. 3, according to an exemplary embodiment, the trench detector 20 of the scanning probe inspector 1 acquires location information of the trench (step S213) by scanning the entire scan area while moving the tip 12 in step S212. Step S213 will be described below with reference to FIG. 5.

Referring to FIG. 5, according to an exemplary embodiment, the trench detector 20 include a light source 21, a photodetector 22, and an analyzer 23. The elements illustrated in FIG. 5, however, are not all necessarily essential for realizing the trench detector 20, and the trench detector 20 may include more or fewer elements than those illustrated in FIG. 5.

According to an exemplary embodiment, the light source 21 irradiates incident light L1 to the cantilever 11.

According to an exemplary embodiment, the tip 12 is moved by a force, such as a Van der Waals force, generated between the atoms at the end of the tip 12 and the atoms of the wafer W.

For example, according to an exemplary embodiment, the cantilever 11 can be deflected by attractive and repulsive forces generated between the atoms at the end of the tip 12 and the atoms of the wafer W.

The deflection degree of the cantilever 11 changes at a location where there exists a trench T.

According to an exemplary embodiment, the photodetector 22 detects reflected light L2, which is incident light L1 reflected from the cantilever 11. In response to a deflection of the cantilever 11, the wavelength, phase, intensity, and location of the reflected light L2 may change.

According to an exemplary embodiment, the analyzer 23 extracts location information of the trench T by analyzing the reflected light L2 detected by the photodetector 22.

For example, according to an exemplary embodiment, the analyzer 23 analyzes the deflection degree of the cantilever 11 by analyzing at least one of the wavelength, phase, intensity, and location of the reflected light L2. The analyzer 23 determined a z value in the X-Y-Z space based on the deflection degree of the cantilever 11. The analyzer 23 determined the trench T location in the scan area R based on a variation in the z value.

According to an exemplary embodiment, since the length of the tip 12 corresponds to the depth, TD of FIG. 1, of the trench T, the tip 12 can be inserted into a region where there exists the trench T, while generally scanning the scan area R with the scanning probe inspector 1. Thus, the trench detector 20 can acquire precise depth information of the trench T based on the z value.

As a result, according to an exemplary embodiment, the trench detector 20 can acquire the location information of the trench T as x, y, and z coordinates.

According to an exemplary embodiment, the acquisition of location information of a trench, however, is not limited to the method illustrated in FIG. 5, and can be acquired by methods other than that set forth in FIG. 5.

Referring again to FIG. 2, according to an exemplary embodiment, after acquiring the location information of the trench in step S21, the controller 40 inserts the tip 12 into an inspection start point where the trench exists based on the location information of the trench (step S22).

For example, according to an exemplary embodiment, referring to FIG. 6, the controller 40 moves the tip 12 over the X-Y plane to an inspection start point R2 from which to start inspection. Once the tip 12 is moved to the inspection start point R2, the controller 40 moves the tip 12 from the inspection start point R2 in the negative Z-axis direction by up to the depth of the trench based on the trench's depth information.

According to an exemplary embodiment, the controller 40 inserts the tip 12 into the trench up to the depth of the trench and then adjusts the location of the tip 12 so that the tip 12 is inserted only to a depth sufficient to perform inspection.

For example, according to an exemplary embodiment, when inspection is performed at a depth less than the depth of the trench, the controller 40 moves the tip 12 in the positive Z-axis direction.

Referring again to FIG. 2, according to an exemplary embodiment, if the tip 12 is positioned at a depth to perform inspection, the controller 40 moves the tip 12 through the trench (step S23).

For example, according to an exemplary embodiment, referring to FIG. 7, the controller 40 moves the tip 12 in the positive or negative Z-axis direction to position the tip 12 at a depth TD1 for performing inspection.

Also, according to an exemplary embodiment, the controller 40 moves the tip 12 in a direction D5 through the trench at the depth TD1. Here, the controller 40 moves the tip 12 in the X-Y plane with the tip 12 fixed at the depth TD1. Since the controller 40 moves the tip 12 through the trench using the trench's location information, the tip 12 does not collide with the sidewalls of the trench.

Referring again to FIG. 2, according to an exemplary embodiment, the defect detector 30 determines whether there is a defect in the trench (S24) as the tip 12 is being moved through the trench in S23. A method of detecting a defect in the trench will be described below with reference to FIGS. 10 through 22.

Referring to FIG. 8, according to an exemplary embodiment, once a defect in a first trench T1 has been detected, the controller 40 moves the tip 12 away from the wafer W in the positive Z-axis direction by up to a predetermined distance A. Then, the controller 40 moves the tip 12 over to a second trench T2 to be inspected next, to prevent the tip 12 from being placed in contact with, and damaged by, the sidewalls of the first trench T1. Thereafter, the controller 40 determine whether there exists a defect in the second trench T2 by performing steps S22, S23, and S24.

In some exemplary embodiments, the scanning probe inspector 1 determines whether there is a defect in a trench at multiple depths.

For example, according to an exemplary embodiment, referring to FIG. 9, the scanning probe inspector 1 inspects a trench for a defect at a first depth B1 and then inspects the trench again for a defect at a second depth B2. Thereafter, the scanning probe inspector 1 inspects the trench yet again for a defect at a third depth B3. The first, second, and third depths B1, B2, and B3 differ from each other.

In some exemplary embodiments, the scanning probe inspector 1 determines whether to inspect a trench at a single depth or at multiple depths based on input from the user.

FIGS. 10 through 13 are schematic views that illustrate an exemplary method of detecting a defect in a trench using a scanning probe inspector 1 according to some exemplary embodiments of the present disclosure. The exemplary embodiment of FIGS. 10 through 13 will hereinafter be described while omitting any redundant descriptions from the exemplary embodiment of FIGS. 1 through 9.

Figure 10:
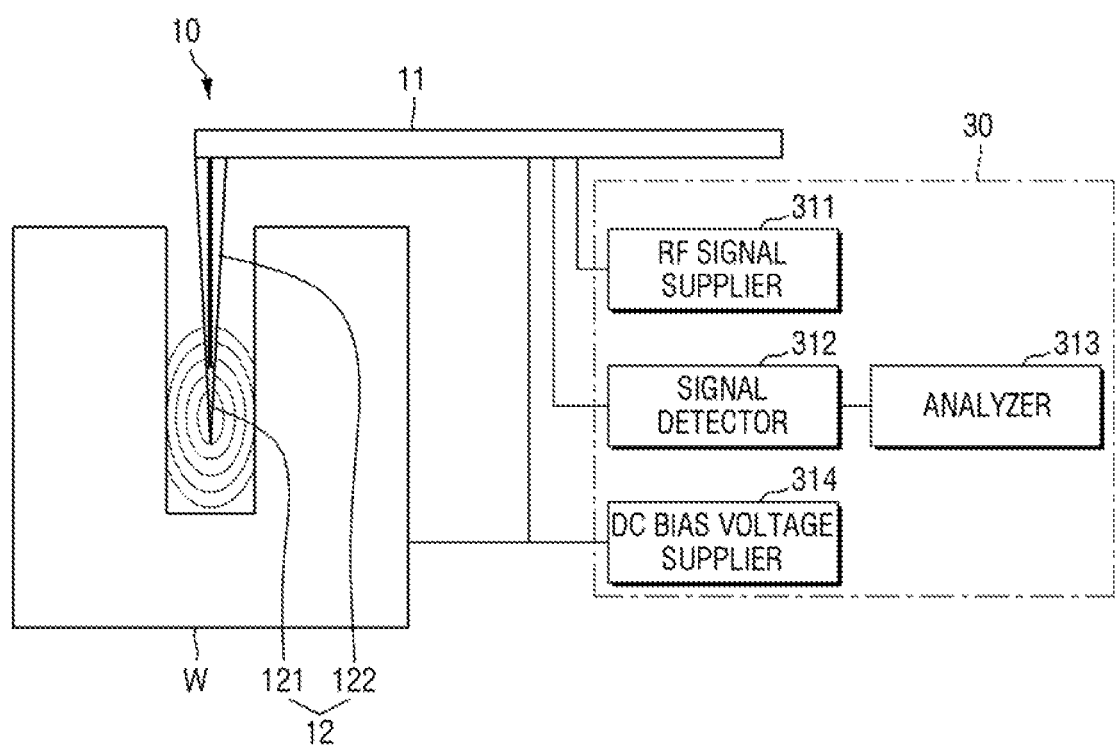
FIGS. 10 through 13 are schematic views that illustrate an exemplary method of detecting a defect in a trench using a scanning probe inspector according to some exemplary embodiments of the present disclosure.
Figure 11:
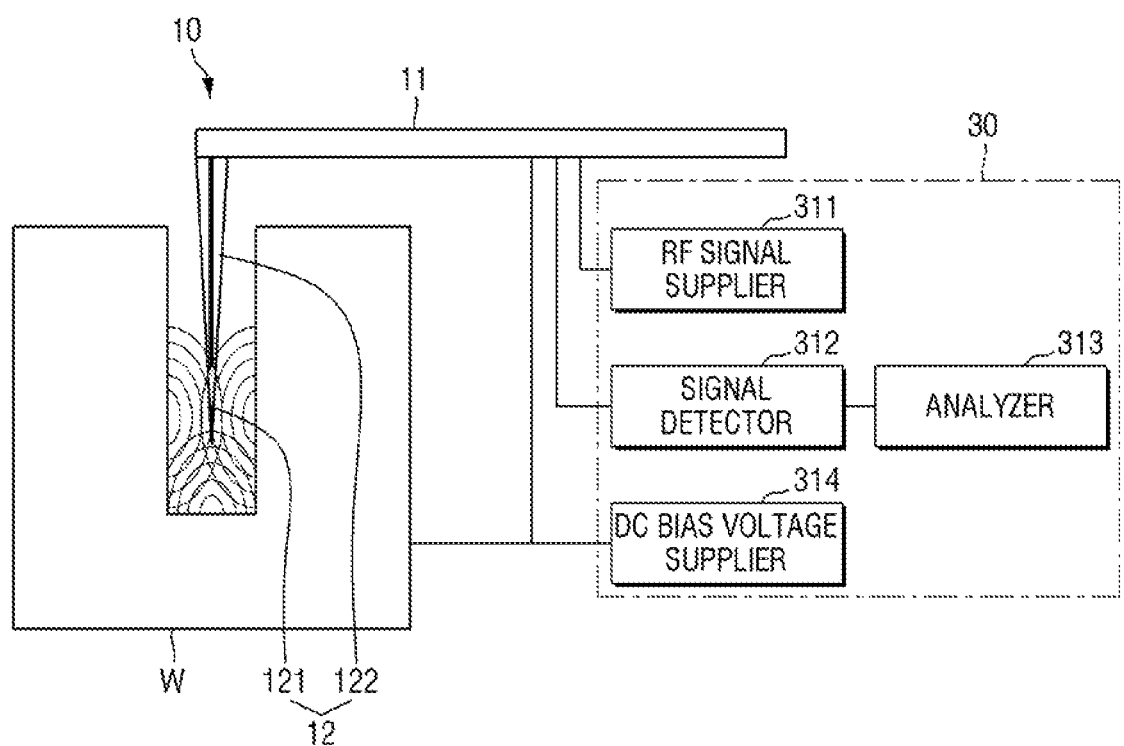
Figure 12:
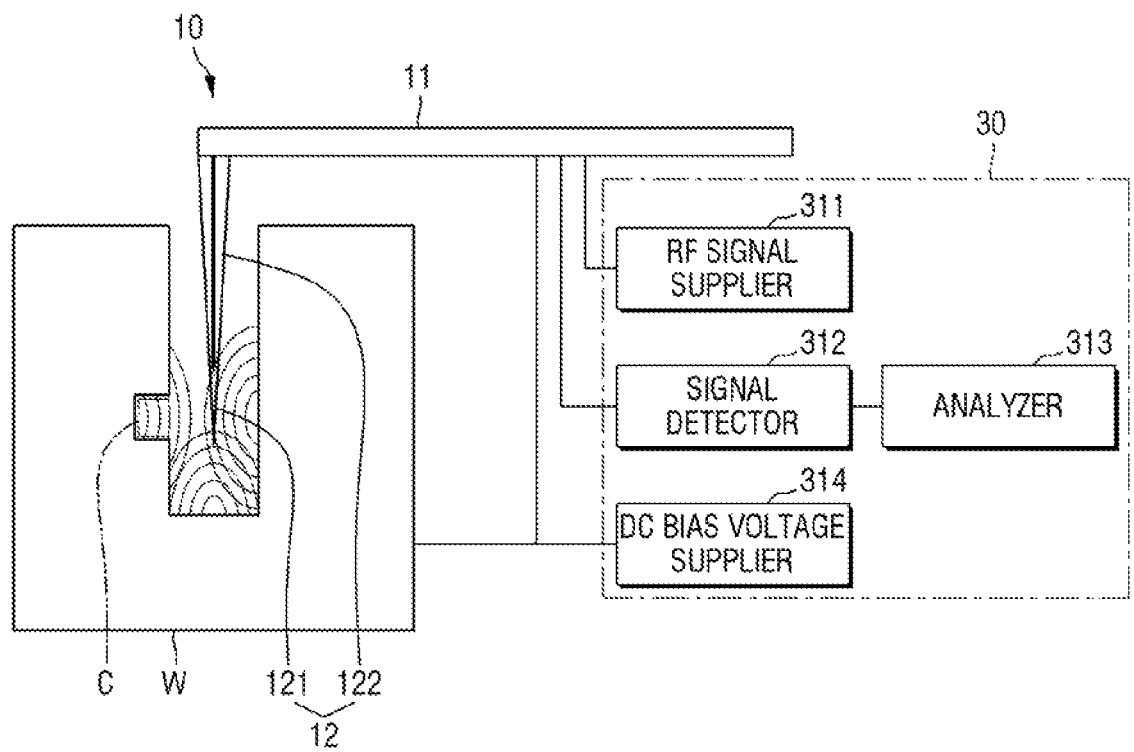

Referring to FIGS. 10 through 12, according to an exemplary embodiment, a defect detector 30 includes a radio frequency (RF) signal supplier 311, a signal detector 312, an analyzer 313, and a direct current (DC) bias voltage supplier 314. The elements illustrated in FIGS. 10 through 12, however, are not all necessarily essential for realizing the defect detector 30, and the defect detector 30 may include more or fewer elements than those illustrated in FIGS. 10 through 12.

According to an exemplary embodiment, the DC bias voltage supplier 314 supplies a DC bias voltage to a wafer W and a probe 10.

According to an exemplary embodiment, the RF signal supplier 311 supplies an RF signal, such as a high frequency signal in the dozens to hundreds of GHz range, to the probe 10.

According to an exemplary embodiment, the signal detector 312 detects an RF signal reflected from a trench.

According to an exemplary embodiment, the analyzer 313 analyzes the reflected RF signal and determines whether there exists a defect in the trench based on variations in the reflected RF signal.

According to an exemplary embodiment, a tip 12 of a probe 10 includes a metallic compound, such as silver chloride. Specifically, a first region 121 of the tip 12 has the metallic compound exposed on the outside thereof, and a second region 122 of the tip 12 is surrounded by a nonmetal. Thus, the metallic compound is exposed only in the first region 121, and not in the second region 122. The second region 122 is where the non-metal is exposed. Thus, an RF signal is transmitted to, and emitted only from, the first region 121.

According to an exemplary embodiment, the first region 121 is positioned at the end of the tip 12 that faces the wafer W. The second region 122 is positioned between a cantilever 11 and the first region 121.

According to an exemplary embodiment, detecting a defect in the trench using the tip 12 is performed as follows.

For example, according to an exemplary embodiment, an RF signal generated by the RF signal supplier 311 is transmitted to the tip 12 via the cantilever 11 when the tip 12 is being moved through the trench. Since the first region 121 of the tip 12 is formed of a metal and the second region of the tip 12 is surrounded by a non-metal, the RF signal is emitted from the first region 121, as illustrated in FIG. 10, but not from the second region 122.

According to an exemplary embodiment, the signal detector 312 detects an RF signal reflected from the trench. The reflected RF signal is the RF signal emitted from the first region 121 and then reflected from the sidewalls and the bottom of the trench.

According to an exemplary embodiment, the analyzer 313 detects the presence of a defect in the trench based on variations in the intensity of the reflected RF signal.

Figure 13:
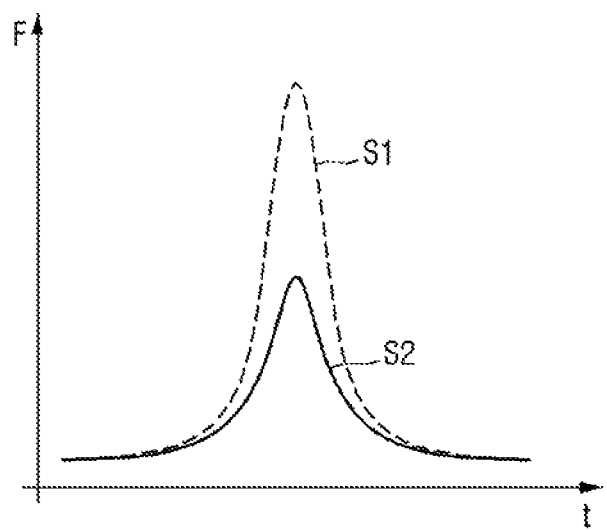

For example, according to an exemplary embodiment, when the tip 12 is being moved inside and through the trench and there is no defect in the trench, as illustrated in FIG. 11, the reflected RF signal has the form of a first signal S1 of FIG. 13. The analyzer 313 determines that there is no defect in the trench when there is no variation in the intensity of the reflected RF signal.

On the other hand, according to an exemplary embodiment, when there is a defect C inside of the trench, as illustrated in FIG. 12, the reflected RF signal has the form of a second signal S2 of FIG. 13. The intensity of the second signal S2 is less than the intensity of the first signal S1 because the capacitance between the tip 12 and the wafer W changes due to the space in the defect C, and as a result, the reflectivity of the RF signal changes.

According to an exemplary embodiment, the analyzer 313 determines that a defect exists at a location where the intensity of the reflected RF signal varies.

Figure 14:
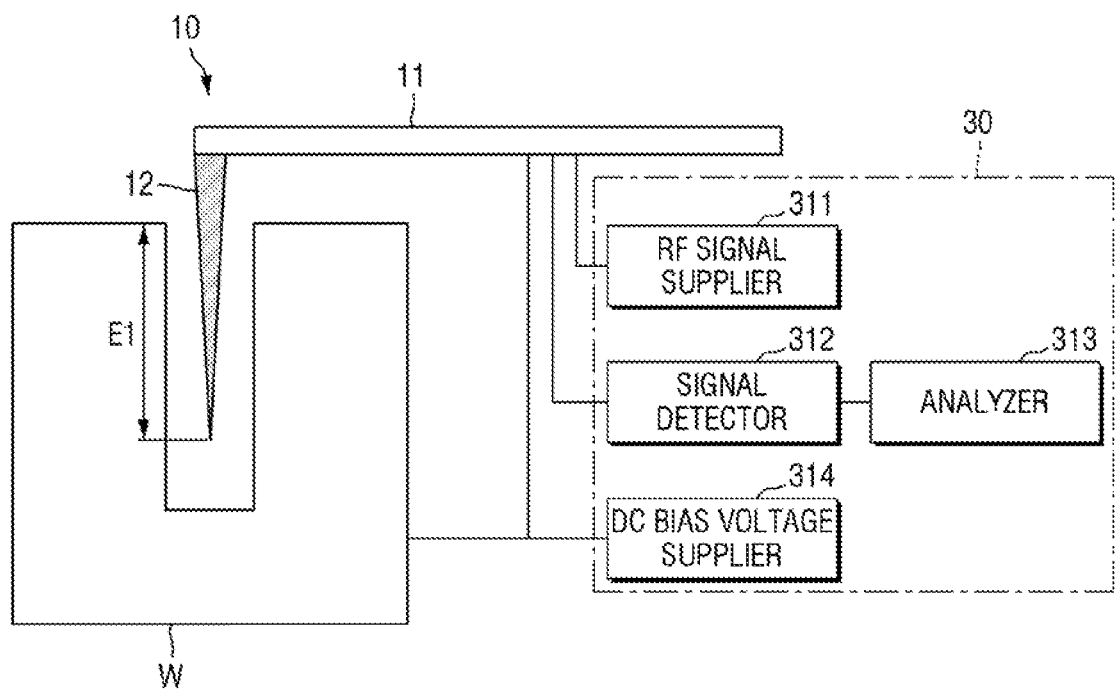
FIGS. 14 through 16 are schematic views that illustrate another exemplary method of detecting a defect in a trench using a scanning probe inspector according to some exemplary embodiments of the present disclosure.
Figure 15:
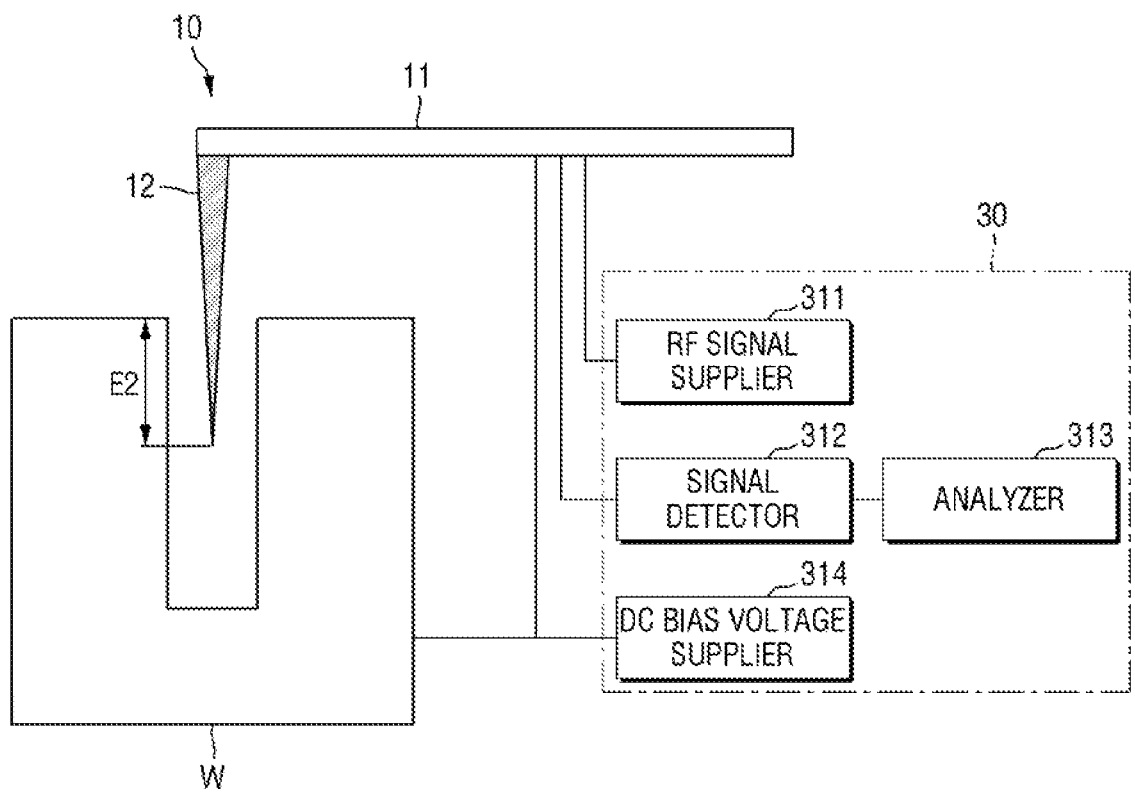
Figure 16:
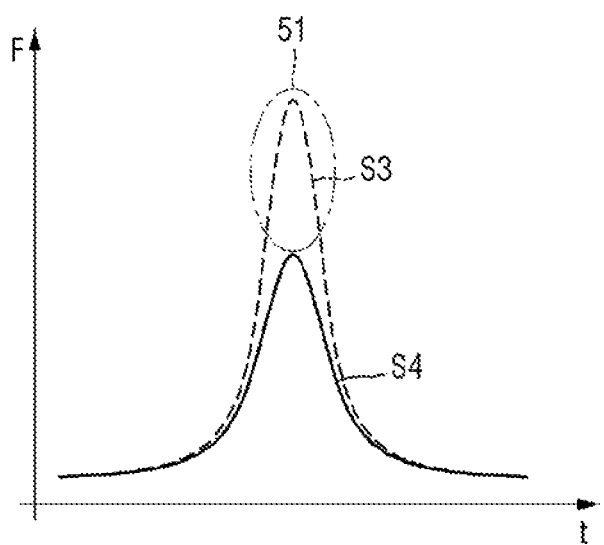

FIGS. 14 through 16 are schematic views that illustrate another exemplary method of detecting a defect in a trench using a scanning probe inspector 1 according to some exemplary embodiments of the present disclosure. The exemplary embodiment of FIGS. 14 through 16 will hereinafter be described while omitting any redundant descriptions from the exemplary embodiment of FIGS. 1 through 9.

Referring to FIGS. 14 and 15, according to an exemplary embodiment, a tip 12 of a probe 10, unlike the tip 12 of FIGS. 10 through 12 is entirely formed of metal and is not surrounded by a non-metal. That is, the metal is exposed on the entire tip 12.

According to an exemplary embodiment, a defect detector 30 includes an RF signal supplier 311, a signal detector 312, an analyzer 313, and a DC bias voltage supplier 314. The RF signal supplier 311, the signal detector 312, the analyzer 313, and the DC bias voltage supplier 314 are substantially the same as their respective counterparts of FIGS. 10 through 12, and thus, detailed descriptions thereof will be omitted. The detection of defects in a trench using the tip 12 will hereinafter be described.

Referring to FIG. 14, according to an exemplary embodiment, when the tip 12 is entirely formed of metal, the controller 40 of FIG. 1 inserts the tip 12 into a trench by up to a first depth E1 and then moves the tip 12 through the trench.

According to an exemplary embodiment, the RF signal supplier 311 supplies an RF signal, such as a high frequency signal in the dozens or hundreds of GHz range to the probe 10 so that the RF signal can be emitted from the entire tip 12 as the tip 12 is being moved through the trench.

According to an exemplary embodiment, the signal detector 312 detects a first RF signal reflected from the trench as the tip 12 is moved through the trench at the first depth E1. The analyzer 313 stores the first RF signal.

Thereafter, referring to FIG. 15, according to an exemplary embodiment, once the movement of the tip 12 through the trench at the first depth E1 of FIG. 14 is complete, the controller 40 of FIG. 1 moves the tip 12 in the trench to a second depth E2 which is less than the first depth E1. Then, the controller 40 moves the tip 12 through the trench at the second depth E2.

According to an exemplary embodiment, the signal detector 312 detects a second RF signal reflected from the trench as the tip 12 is being moved through the trench at the second depth E2.

According to an exemplary embodiment, the analyzer 313 can recognize the difference between the first and second RF signals. The analyzer 313 detects a defect in the trench based on variations in differences between the first and second RF signals.

For example, referring to FIG. 16, according to an exemplary embodiment, a difference 51 between first and second RF signals S3 and S4 does not change if there are no defects in the trench. The difference 51 between the first and second RF signals S3 and S4 do change if there is a defect in the trench.

Thus, according to an exemplary embodiment, the analyzer 313 determines that there exists a defect at a location where the difference 51 between the first and second RF signals S3 and S4 changes.

Figure 17:
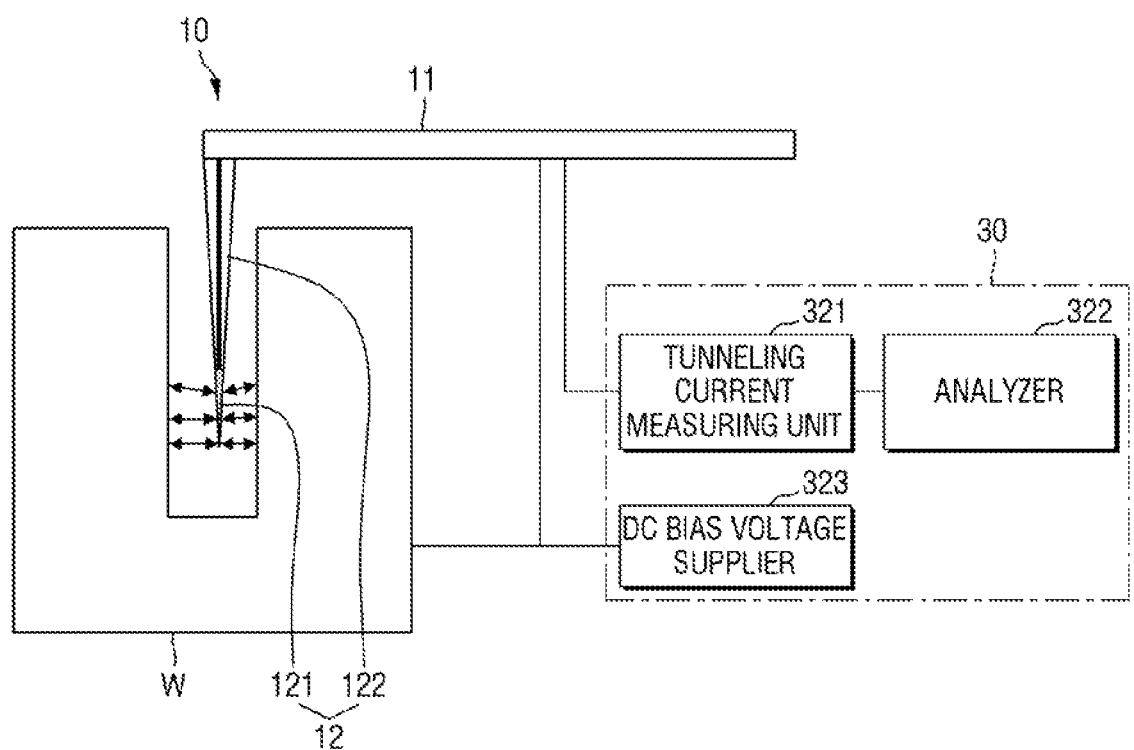
FIGS. 17 and 18 are schematic views that illustrate another exemplary method of detecting a defect in a trench using a scanning probe inspector according to some exemplary embodiments of the present disclosure.
Figure 18:
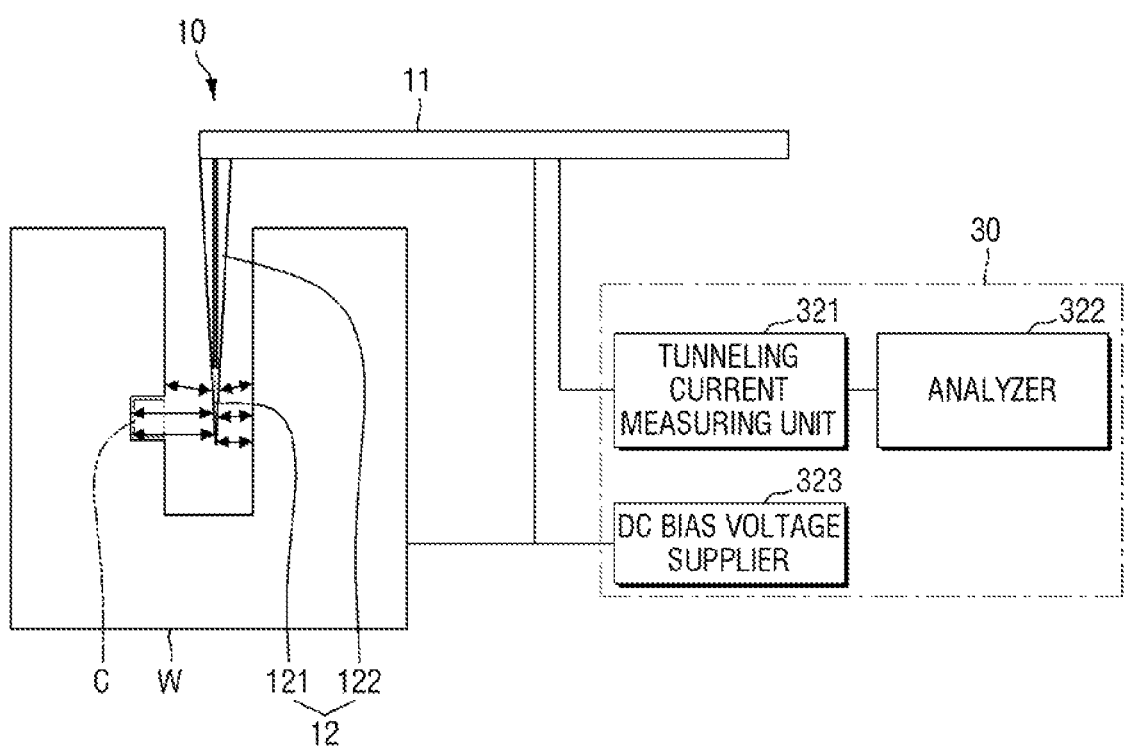

FIGS. 17 and 18 are schematic views that illustrate another exemplary method of detecting a defect in a trench using a scanning probe inspector 1 according to some exemplary embodiments of the present disclosure. The exemplary embodiment of FIGS. 17 and 18 will hereinafter be described while omitting any redundant descriptions from the exemplary embodiment of FIGS. 1 through 9.

Referring to FIGS. 17 and 18, according to an exemplary embodiment, a defect detector 30 includes a tunneling current measuring unit 321, an analyzer 322, and a DC bias voltage supplier 323. The elements illustrated in FIGS. 17 and 18, however, are not all necessarily essential for realizing the defect detector 30, and the defect detector 30 may include more or fewer elements than those illustrated in FIGS. 17 and 18.

According to an exemplary embodiment, a tip 12 included in a probe 10 according to some exemplary embodiments of the present disclosure, comprises a metallic compound, such as silver chloride. Specifically, the metallic compound is exposed in a first region 121 of the tip 12, and is surrounded by a non-metal in a second region 122 of the tip 12. Thus, the metallic compound is exposed only in the first region 121, and not in the second region 122. The second region 122 is where the non-metal is exposed.

According to an exemplary embodiment, the first region 121 is positioned at the end of the tip 12. The second region 122 is positioned between a cantilever 11 and the first region 121.

According to an exemplary embodiment, the DC bias voltage supplier 323 supplies a DC bias voltage to the wafer W and probe 10.

According to an exemplary embodiment, the tunneling current measuring unit 321 measures a tunneling current sensed from the first region 121 when the DC bias voltage is supplied to the wafer W and the probe 10.

According to an exemplary embodiment, the analyzer 322 detects a defect in a trench based on variations in the tunneling current intensity.

According to an exemplary embodiment, the detection of defects in the trench using the tip 12 is performed as follows.

According to an exemplary embodiment, the DC bias voltage supplier 323 supplies a bias voltage to the probe 10 and wafer W as the tip 12 is being moved through the trench. Since the first region 121 of the tip 12 is formed of a metallic compound and the second region of the tip 12 is surrounded by a non-metal, a tunneling current can be sensed from the first region 121.

According to an exemplary embodiment, the tunneling current measuring unit 321 measures the tunneling current from the first region 121.

According to an exemplary embodiment, when the tip 12 is being moved inside and through the trench, the tunneling current is constant if there is no defect in the trench, as illustrated in FIG. 18.

On the other hand, according to an exemplary embodiment, when there is a defect C on the inside of the trench, as illustrated in FIG. 12, the tunneling current decreases because the tunneling current is sensitive to the distance between the tip 12 and the wafer W.

Accordingly, according to an exemplary embodiment, the analyzer 322 determines that there exists a defect at a location where the tunneling current decreases.

Figure 19:
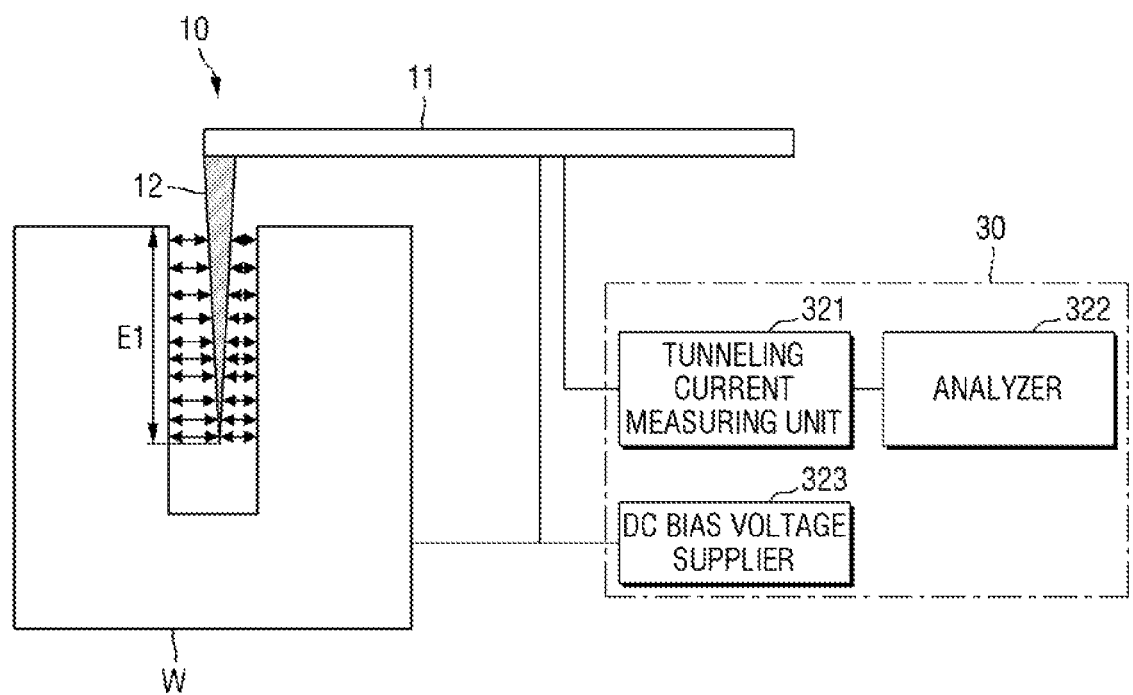
FIGS. 19 and 20 are schematic views that illustrate another exemplary method of detecting a defect in a trench using a scanning probe inspector according to some exemplary embodiments of the present disclosure.
Figure 20:
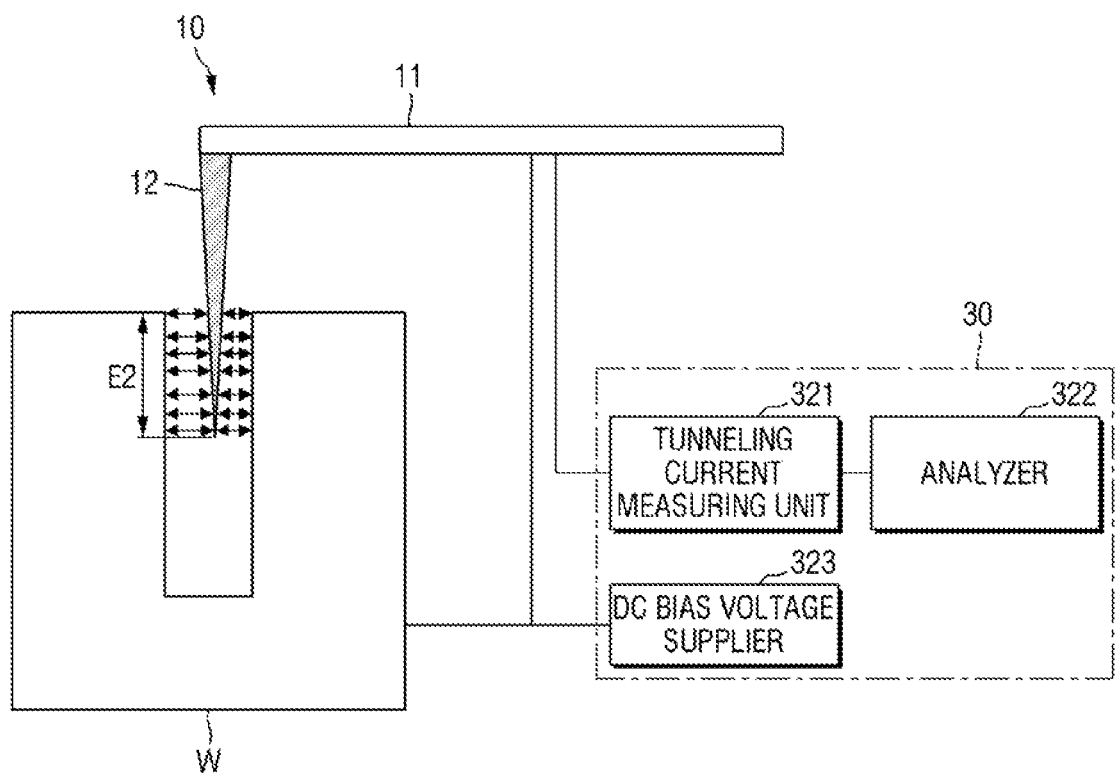

FIGS. 19 and 20 are schematic views that illustrate another exemplary method of detecting a defect in a trench using a scanning probe inspector 1 according to some exemplary embodiments of the present disclosure. The exemplary embodiment of FIGS. 19 and 20 will hereinafter be described while omitting any redundant descriptions from the exemplary embodiment of FIGS. 1 through 9.

Referring to FIGS. 19 and 20, according to an exemplary embodiment, a tip 12 in a probe 10 according to some exemplary embodiments of the present disclosure, unlike the tip 12 of FIGS. 17 and 18, is entirely formed of a metal and is not surrounded by a non-metal. That is, the metal is exposed on the outside of the entire tip 12.

According to an exemplary embodiment, a defect detector 30 includes a tunneling current measuring unit 321, an analyzer 322, and a DC bias voltage supplier 323. The tunneling current measuring unit 321, the analyzer 322, and the DC bias voltage supplier 323 are substantially the same as their respective counterparts of FIGS. 17 and 18, and thus, detailed descriptions thereof will be omitted. The detection of defects in a trench using the tip 12 will hereinafter be described.

Referring to FIG. 19, according to an exemplary embodiment, when the tip 12 is entirely formed of a metal, the controller 40 of FIG. 1 inserts the tip 12 into a trench by up to a first depth E1 and then moves the tip 12 through the trench.

According to an exemplary embodiment, the DC bias voltage supplier 323 supplies a bias voltage to a probe 10 and a wafer W as the tip 12 is being moved through the trench at the first depth E1. Then, the tunneling current measuring unit 321 can measure a first tunneling current sensed from the entire probe 10.

Referring to FIG. 20, according to an exemplary embodiment, once the movement of the tip 12 through the trench at the first depth E1 of FIG. 19 is complete, the controller 40 of FIG. 1 moves the tip 12 in to a second depth E2 which is less than the first depth E1. Then, the controller 40 moves the tip 12 through the trench at the second depth E2.

According to an exemplary embodiment, the DC bias voltage supplier 323 supplies a bias voltage to the probe 10 and wafer W as the tip 12 is being moved through the trench at the second depth E2. Then, the tunneling current measuring unit 321 measures a second tunneling current sensed from the entire probe 10.

According to an exemplary embodiment, the analyzer 322 detects a defect in the trench based on variations in the difference between the first and second tunneling currents.

For example, according to an exemplary embodiment, when there is no defect in the trench, the difference between the first and second tunneling currents is constant. Thus, when the difference between the first and second tunneling currents changes, the analyzer 322 determines that there exists a defect at a location where the difference between the first and second tunneling currents changes.

Figure 21:
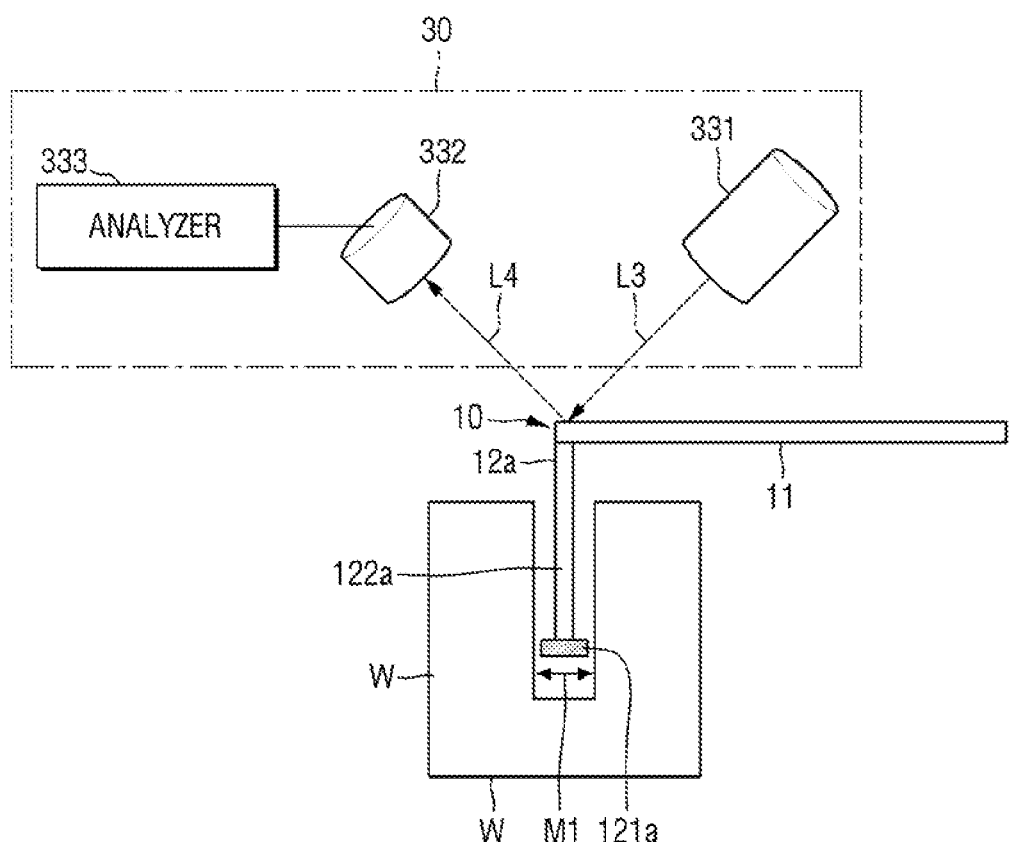
FIGS. 21 and 22 are schematic views that illustrate another exemplary method of detecting a defect in a trench using a scanning probe inspector according to some exemplary embodiments of the present disclosure.
Figure 22:
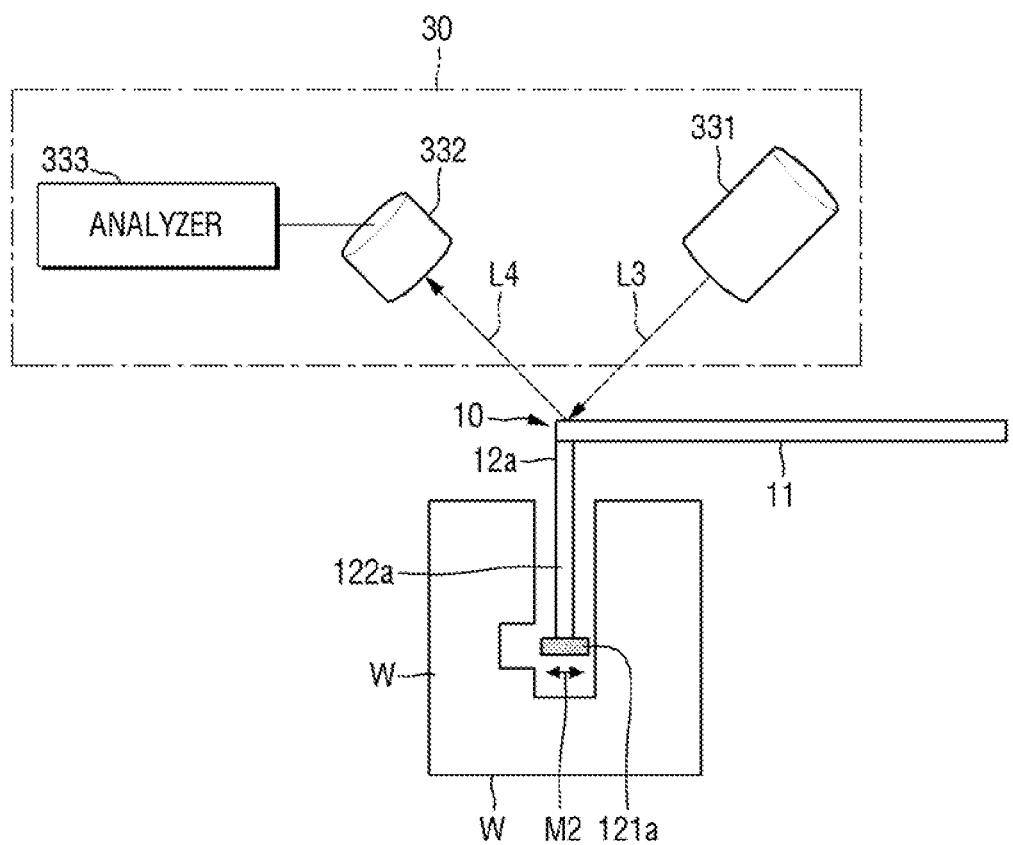

FIGS. 21 and 22 are schematic views that illustrate another exemplary method of detecting a defect in a trench using a scanning probe inspector 1 according to some exemplary embodiments of the present disclosure. The exemplary embodiment of FIGS. 19 and 20 will hereinafter be described while omitting any redundant descriptions from the exemplary embodiment of FIGS. 1 through 9.

Referring to FIGS. 21 and 22, according to an exemplary embodiment, a probe 10 includes a hammer-type tip 12a and a cantilever 11.

For example, according to an exemplary embodiment, the width of a first portion 121a of the hammer-type tip 12a is greater than the width of a second portion 122a of the hammer-type tip 12a. A first end of the second portion 122a is connected to the cantilever 11, and a second end of the second portion 122a, which is opposite to the first end of the second portion 122a, is connected to the first portion 121a. Since the first portion 121a is wider than the second portion 122a, the first portion 121a is positioned closer to the sidewalls of a trench than the second portion 122a. Thus, a defect in the trench can be precisely detected.

According to an exemplary embodiment, a defect detector 30 includes a light source 331, a photodetector 332, and an analyzer 333.

According to an exemplary embodiment, the light source 331 irradiates incident light L3 to the cantilever 11.

According to an exemplary embodiment, the photodetector 332 detects light L4 reflected from the cantilever 11.

According to an exemplary embodiment, the analyzer 333 detects a defect in the trench by analyzing the reflected light L4.

According to an exemplary embodiment, the detection of a defect in the trench using the hammer-type tip 12a is performed as follows.

Referring to FIG. 21, according to an exemplary embodiment, the controller 40 of FIG. 1 moves the hammer-type tip 12a through the trench so that the first portion 121a has a first motion M1 that swings between the trench sidewalls without colliding with the trench sidewalls.

According to an exemplary embodiment, when the first portion 121a of hammer-type tip 12a moves with the first motion M1, the cantilever 11 also moves.

According to an exemplary embodiment, the incident light L3 irradiated from the light source 331 is reflected by the cantilever 11, and the photodetector 332 detects the reflected light L4. The analyzer 333 determines the degree of movement of the first portion 121a by analyzing the reflected light L4 detected by the photodetector 332.

For example, according to an exemplary embodiment, the analyzer 333 determines movement of the cantilever 11 by analyzing variations in at least one of the wavelength, phase, intensity, and location of the reflected light L4. The analyzer 333 determines the degree of movement of the first portion 121a based on the movement of the cantilever 11.

According to an exemplary embodiment, the analyzer 333 detects a defect in the trench based on variations in the degree of movement of the first portion 121a.

According to an exemplary embodiment, when there is no defect in the trench, as illustrated in FIG. 21, the first portion 121a of the hammer-type tip 12a has the first motion M1.

On the other hand, according to an exemplary embodiment, when there is a defect C in the trench, as illustrated in FIG. 22, the first portion 121a is more distant from the trench sidewalls due to the defect C. Thus, the van der Waals forces decrease, and as a result, the swing amplitude of the first portion 121a decreases. That is, the first portion 121a has a second swing motion M2 whose amplitude is less the first swing motion M1. Therefore, the analyzer 333 can determine that there exists a defect at a location where the swing amplitude of the first portion 121a has decreased.

Figure 23:
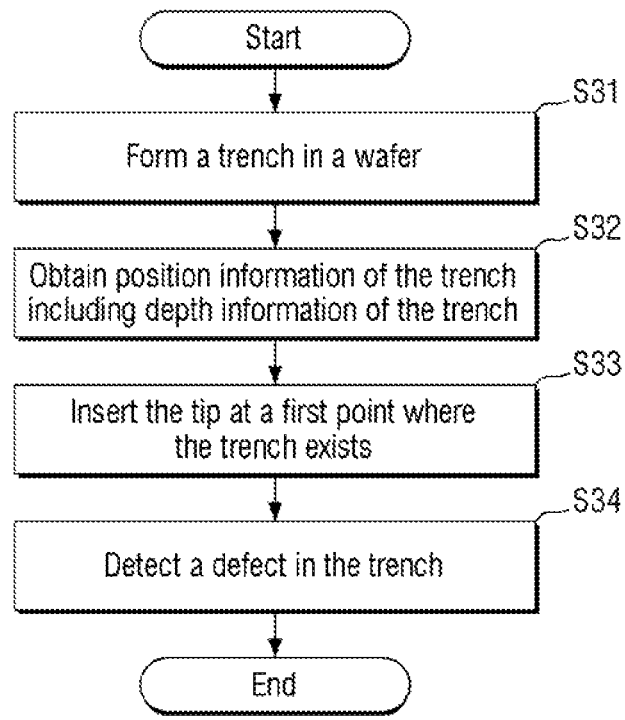
FIG. 23 is a flowchart of a method of fabricating a semiconductor according to some exemplary embodiments of the present disclosure.

FIG. 23 is a flowchart of a method of fabricating a semiconductor according to some exemplary embodiments of the present disclosure. The exemplary embodiment of FIG. 23 will hereinafter be described while omitting redundant descriptions from the exemplary embodiments of FIGS. 1 through 22.

Referring to FIG. 23, according to an exemplary embodiment, a trench may be formed in a wafer (step S31).

According to an exemplary embodiment, once the trench is formed in the wafer in step S31, location information of the trench, including depth information, can be acquired using a scanning probe inspector 1 (step S32). The scanning probe inspector 1 includes a tip whose length corresponds to the depth of the trench.

According to an exemplary embodiment, once location information of the trench has been acquired in step S32, the controller of the scanning probe inspector 1 inserts the tip of the scanning probe inspector 1 at a first point where there exists a trench based on the location information of the trench (step S33). The first point is a location from which a search for defects in the trench is started.

According to an exemplary embodiment, once the tip of the scanning probe inspector 1 is inserted into the first location in step S33, the controller of the scanning probe inspector 1 moves the tip through the trench using the location information of the trench and can detect any defects present in the trench (S34).

Although some exemplary embodiments of the present inventive concept have been disclosed for illustrative purposes, those skilled in the art will appreciate that various modifications, additions and substitutions are possible, without departing from the scope and spirit of the embodiments of inventive concept as disclosed in the accompanying claims.

What is claimed is:
1. A scanning probe inspector, comprising:
a probe that includes a cantilever and a tip whose length corresponds to a depth of a trench formed in a wafer, the trench extending in a first direction;
a trench detector that acquires location information of the trench using the probe, wherein the location information includes depth information of the trench;

a controller that inserts the tip into a first point the wafer at a location where there exists the trench based on the location information acquired by the trench detector, and moves the tip in the first direction through the trench at first inspection depth using the location information, and moves the tip in the first direction through the trench at a second inspection depth different from the first inspection depth using the location information; and a defect detector that detects a defect on a sidewall of the trench at the first or second inspection depths as the tip is moved in the first direction through the trench.

2. The scanning probe inspector of claim 1, wherein the tip is entirely formed of an exposed metal.

3. The scanning probe inspector of claim 2, wherein the controller inserts the tip into the first point up to the first inspection depth or up to the second inspection depth, and moves the tip along the trench based on the location information, and the defect detector includes a DC bias voltage supplier that supplies a DC bias voltage to the wafer and the probe, an RF signal supplier that supplies an RF signal to the probe wherein the RF signal is emitted from the entire probe, a signal detector that detects a first RF signal reflected from the trench as the tip is moved along the trench at the first inspection depth, and detects a second RF signal reflected from the trench as the tip is moved along the trench at the second inspection depth, and an analyzer that detects the defect in the trench based on variations in a difference between the first and second RF signals.

4. The scanning probe inspector of claim 2, wherein the controller inserts the tip into the first point up to the first inspection depth or up to the second inspection depth, and moves the tip along the trench based on the location information, and the defect detector includes a DC bias voltage supplier that supplies a DC bias voltage to the wafer and the probe, a tunneling current measuring unit which measures a first tunneling current sensed from the entire tip as the tip is moved along the trench at the first inspection depth and measures a second tunneling current sensed from the entire tip as the tip is moved along the trench at the second inspection depth, and an analyzer that detects the defect in the trench based on variations in a difference between the first and second tunneling currents.

5. A scanning probe inspector comprising:
a probe that includes a cantilever and a tip whose length corresponds to a depth of a trench that is formed in a wafer, the trench extending in a first direction;
a trench detector that acquires location information of the trench using the probe, wherein the location information includes depth information of the trench;
a controller that inserts the tip into a first point on the wafer at a location where there exists the trench based on the location information, and moves the tip in the first direction through the trench at a first inspection depth using the location information wherein the controller further moves the tip in the first direction through the trench at a second inspection depth using the location information, the second inspection depth being different from the first inspection depth; and
a defect detector that detects a defect on a sidewall of the trench at the first inspection depth as the tip is moved in the first direction through the trench.

6. A scanning probe inspector, comprising:
a probe that includes a cantilever, and a tip whose length corresponds to a depth of a trench that is formed in a wafer;
a trench detector that acquires location information of the trench using the probe, wherein the location information includes depth information of the trench; and
a controller that moves the tip through the trench at a first inspection depth using the location information wherein the controller further moves the tip through the trench at a second inspection depth using the location information, the second inspection depth being different from the first inspection depth; and
a defect detector that detects a defect on a sidewall of the trench at the first inspection depth.

7. The scanning probe inspector of claim 1, wherein the trench detector scans a bottom and the sidewalls of the trench to acquire the location information.

8. The scanning probe inspector of claim 7, wherein the controller prevents the tip from colliding with the sidewalls of the trench by using the location information, as the tip is moved in the first direction through the trench.

9. The scanning probe inspector of claim 1, the trench detector acquires the location information of the trench by scanning an entire scan area of the trench.

10. The scanning probe inspector of claim 5, wherein the controller moves the tip in the first direction through the trench at the second inspection depth, after the controller moves the tip in the first direction through the trench at the first inspection depth.

11. The scanning probe inspector of claim 5, wherein the trench detector provides the controller with the location information, after acquiring the location information.

12. The scanning probe inspector of claim 5, wherein the trench detector acquires the location information by scanning an entire scan area of the trench.

13. The scanning probe inspector of claim 12, wherein the scan area is determined along an X-Y plane on the trench.

14. The scanning probe inspector of claim 5, wherein the trench detector scans a bottom and the sidewalls of the trench to acquire the location information, and
the controller prevents the tip from colliding with the sidewalls of the trench by using the location information, as the tip is moved in the first direction through the trench.

15. The scanning probe inspector of claim 6, wherein the trench extends in a first direction, and
the controller moves the tip in the first direction through the trench at the first inspection depth.

16. The scanning probe inspector of claim 6, wherein the trench detector provides the controller with the location information, after acquiring the location information.

17. The scanning probe inspector of claim 6, wherein the trench detector acquires the location information by scanning an entire scan area of the trench.

18. The scanning probe inspector of claim 6, wherein the trench detector scans a bottom and the sidewalls of the trench to acquire the location information, and
the controller prevents the tip from colliding with the sidewalls of the trench by using the location information, as the tip is moved in the first direction through the trench.

* * * * *